Figure 1:
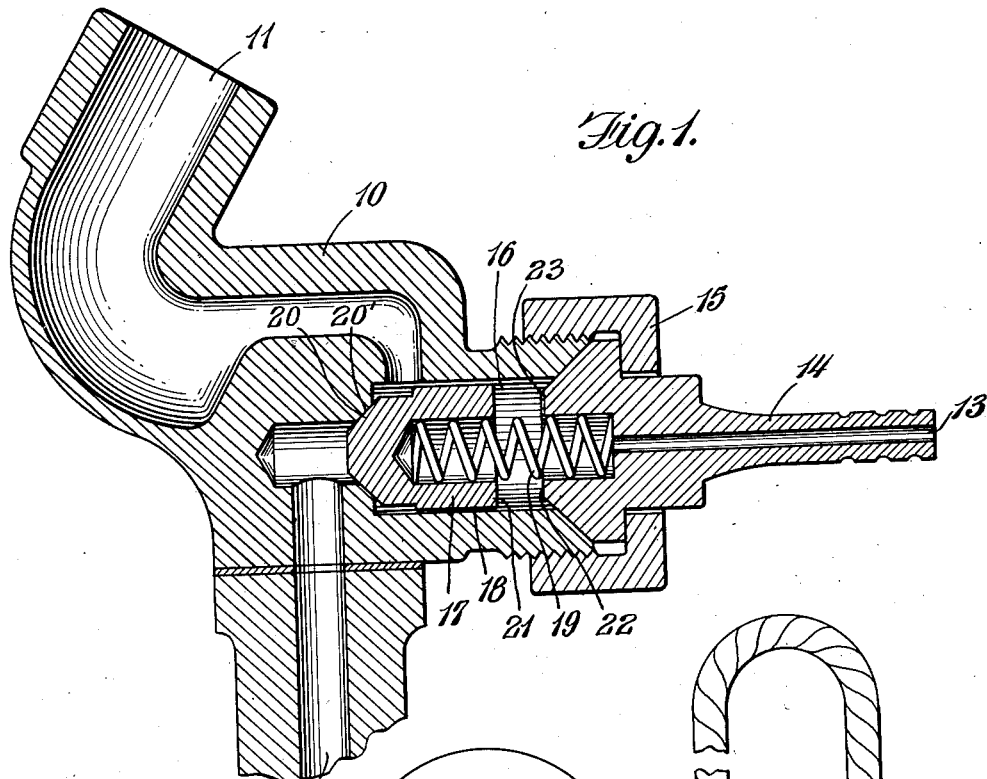

Sept. 29, 1936.    H. HOLLERITH, JR    2,055,576
PILOT CONTROLLED VALVE
Filed Jan. 28, 1936

Inventor
Herman Hollerith, Jr.

By
Attorney

Patented Sept. 29, 1936

2,055,576

UNITED STATES PATENT OFFICE 2,055,576

PILOT CONTROLLED VALVE

Herman Hollerith, Jr., Moorestown, N. J.

Application January 28, 1936, Serial No. 61,246

6 Claims. (Cl. 137—139)

This invention relates to a valve assembly in which the pressure change caused by the actuation of a single secondary bleeding or pilot valve is transmitted through a single line to a pressure responsive main valve, and opens and closes the same. The supply of the fluid governed by the valve assembly is often limited and economy in the consumption thereof desired; whereby it must be considered that the fluid discharged or bled through the pilot valve often constitutes a partial or complete loss. There arises then the problem of so to design the valve assembly as to reduce to a minimum the rate of discharge of the fluid through the pilot valve. The minimum is governed by the necessity of placing and of keeping the main valve into and in bleed-corresponding phase. It is furthermore governed by the necessity of a small time lag between the actuation of the pilot valve and the response of the main valve. This time lag becomes particularly noticeable if the controlled fluid is elastic, as with air and steam; for the more elastic the fluid is, the more of it has to be discharged through the pilot valve before a specified pressure diminution is transmitted to and built up within the pressure responsive main valve.

I have discovered that the consideration of the time lag requires a larger rate of bleeding, but only during limited intervals, than the consideration of merely maintaining the main valve in its bleed-responsive phase; and that therefore the fluid consumption can be greatly economized by using two or more rates of bleeding during the different steps of the operation of the valve assembly.

It is the broad object of the present invention to provide a valve assembly of the described kind which combines a reliable maintaining of the bleed-corresponding phase of the main valve, a quick response of the main valve to the pilot valve, and an economical consumption of the bleeding fluid.

This object is obtained by providing means for keeping the bleeding at different rates.

The object is further obtained by establishing a causal or operative relation between the effective cross section of the bleeding line and the phase, condition, or position of the main valve.

The object is further obtained by providing for a large rate of bleeding while the main valve is partially or wholly out of the bleed-responsive phase, and for a small rate of bleeding while the main valve is in the bleed-responsive phase.

These and other desirable objects and advantages of the present invention will be illustrated in the accompanying drawing and described in the specification, a certain preferred embodiment being disclosed by way of illustration only, for, since the underlying principles may be incorporated in other specific devices, it is not intended to be limited to the one here shown, except as such limitations are clearly imposed by the appended claims.

Figure 2:
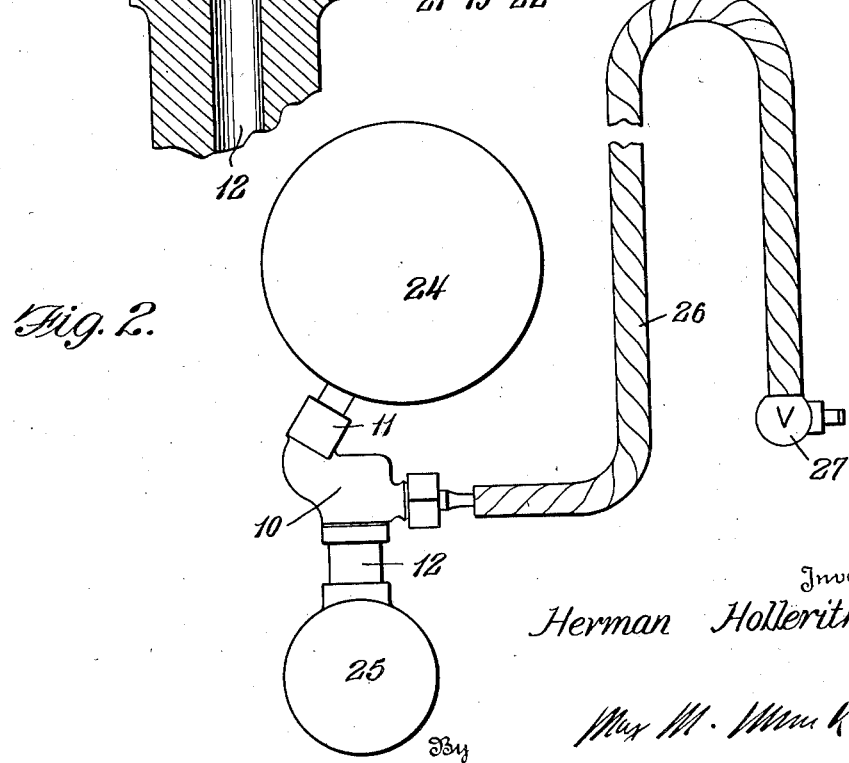

In the drawing, equal reference characters designate the same part throughout the different views, of which Fig. 1 represents a cross section through the main valve, and Fig. 2 represents a schematic view of the complete valve assembly including the valve represented in Fig. 1.

The main valve consists of a valve casing 10 with an inlet 11 and a main outlet 12. A bleeding outlet 13 is further provided in nipple 14, said nipple being tightly secured to the casing 10 by means of a union nut or ring 15. All three ports communicate with a cylindrical chamber 16 within casing 10. Said chamber contains a reciprocable valve piston 17, in loose sliding contact with the cylindrical wall of said chamber, so that there remains a fluid passage 18 all around between piston 17 and casing 10. A helical compression spring 19 is inserted between the nipple piece 14 and the piston 17 so as to push said piston towards the left of Fig. 1.

When so moved to the left, the left face 20 of the piston engages a valve seat 20' ground in the casing and terminating outlet 12 and closes the same tightly. The opposite and right hand face of the piston 17 is adapted to engage with a second valve seat 22 provided on the inner end of the nipple piece 14 and terminating the bleeding outlet 13. When so engaging, (in the extreme right position of the piston not shown in the drawing) the communication between exit 13 and chamber 16 is nevertheless not completely interrupted, but only partially, in that a groove 23 is spared out of the valve seat 22 for providing for such cross section-diminished communication even if face 21 and seat 22 engage tightly with each other.

Entrance opening 11 is connected to a tank or pressure supply 24. Exit 12 leads to a fluid consuming device 25. Exit 13 leads to a hose 26 constituting the bleeding line, and through it to a bleeding or pilot valve 27, through which the fluid will be released into the open atmosphere, or discharged into some fluid consuming device.

The valve assembly operates in the following manner. When the consuming device 25 is out of use, bleeding valve 27 is closed. The pressure of tank 24 extends then up to the bleeding valve, and hence piston 17 is all around subjected to equal pressure. Spring 19 moves it therefore to the left making it engage valve seat 20', whereby device 25 is entirely disconnected from tank 24. Since valve 27 is also closed, no consumption of fluid takes place.

For supplying device 25 with fluid, pilot valve 27 is opened. This reduces the pressure behind the right face of piston 17 because of the large flow resistance of the fluid passing through gap 18. The valve piston moves therefore to the right, whereby the tension of spring 19 is overcome by the difference of the pressure on both sides of the piston, and whereby communication is established between 24 and 25. It does not take a long time for the fluid to assume its motion through gap 18, because at this stage of the operation the effective cross-section of the bleeding line is large, 21 and 22 being out of engagement.

After the piston has fully reached its right hand position, the effective cross section of the line 26 is materially reduced, in that now 21 and 22 are engaged, and only groove 23 remains open. In consequence, the bleeding through valve 27 is now materially reduced from before, effecting a saving in the consumption of the fluid. Groove 23 is large enough for making the pressure responsive valve 17 operate, but the rate of bleeding through the groove 23 only would not give a sufficiently quick response of piston 17 to a change in the setting of valve 27.

I claim:

1. A valve assembly comprising a pressure responsive main valve, a single bleeding line operatively communicating with said main valve, and means for discharging fluid from said line in such manner that an initial rate of discharge is automatically diminished without arresting the discharge altogether after a small lapse of time from the beginning of the discharge.

2. A valve assembly comprising a pressure responsive main valve, a single bleeding line operatively communicating with said main valve, means for discharging fluid from said line, and means for automatically and partially diminishing the effective cross section of said line after a small lapse of time from the beginning of the discharge.

3. A valve assembly comprising a pressure responsive main valve, a single pilot valve, a conduit line operatively connecting said two valves, and means for changing the effective cross section of said conduit line controlled by the main valve.

4. A valve assembly comprising a pressure responsive main valve, a single pilot valve, a conduit line operatively connecting said two valves, and means for holding partially diminished the effective cross section of said conduit line while the main valve is in its bleed-corresponding phase.

5. A valve assembly comprising a pressure responsive main valve, a single pilot valve, a conduit line operatively connecting said two valves, and means controlled by the main valve for keeping the effective cross section of said conduit line partially closed while the main valve is in its bleed-responsive phase.

6. A valve assembly comprising a casing having cylindrical walls, an entrance port, an exit port terminating in a whole valve seat, and a bleed port terminating in a valve seat from which a groove has been spared out; a reciprocable valve piston within said casing between the entrance and exit ports on the one hand and the bleeding port on the other in loose engagement with said cylindrical walls and with opposite faces adapted to engage alternately said valve seats; a single pilot valve; and a single bleeding line connecting the bleed port with the pilot valve and having at all points cross sections considerably in excess of the cross section of said groove.

HERMAN HOLLERITH, Jr.